US012619972B2

(12) United States Patent
Chen et al.

(10) Patent No.: US 12,619,972 B2
(45) Date of Patent: May 5, 2026

(54) TOKEN INTERACTION USING MULTIVARIABLE REGRESSION PROCESS

(71) Applicant: Visa International Service Association, San Francisco, CA (US)

(72) Inventors: Yuexi Chen, Foster City, CA (US); Ratna Deepthi Jarugu, Santa Clara, CA (US); Esha Dutta, Leander, TX (US); Jennifer Kim Astrein, San Francisco, CA (US); Sonia Gupta, Pleasanton, CA (US); Geraldine Mitchley, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 4 days.

(21) Appl. No.: 18/590,862

(22) Filed: Feb. 28, 2024

(65) Prior Publication Data

US 2025/0272670 A1      Aug. 28, 2025

(51) Int. Cl.
G06Q 20/40        (2012.01)
G06Q 20/32        (2012.01)
H04L 9/40         (2022.01)
(52) U.S. Cl.
CPC ..... G06Q 20/3278 (2013.01); G06Q 20/4016 (2013.01)

(58) Field of Classification Search
None
See application file for complete search history.

(56) References Cited

U.S. PATENT DOCUMENTS

| | | | |
|---|---|---|---|
| 10,643,180 B2 * | 5/2020 | Boding | G06Q 40/02 |
| 10,650,126 B2 | 5/2020 | Bayer et al. | |
| 10,867,304 B2 * | 12/2020 | Weber | G06Q 20/4016 |
| 2019/0392421 A1 | 12/2019 | Bonding | |
| 2022/0245644 A1 * | 8/2022 | Norman | G06Q 50/265 |

* cited by examiner

*Primary Examiner* — Bennett M Sigmond
*Assistant Examiner* — Bhavin D Shah
(74) *Attorney, Agent, or Firm* — Kilpatrick Townsend & Stockton LLP

(57) ABSTRACT

A method is disclosed. The method includes receiving interaction data related to a plurality of interactions in a time period, determining a multiple variable regression formula, and then determining a coefficient of determination associated with the multiple variable regression formula and the interaction data. The method further includes determining if the coefficient of determination satisfies a threshold or is maximized. If the coefficient of determination does not satisfy the threshold or is not maximized, then adjusting the slope coefficients. If the coefficient of determination does satisfy the threshold or is maximized, then using the multiple variable regression formula to determine risk associated with future interactions.

19 Claims, 7 Drawing Sheets

300

| Token Transaction | | |
|---|---|---|
| 302 | Token Cryptogram Vlidated | True/False | i1 |
| 304 | Device Binding Verified | True/False | i2 |
| 306 | CDCVM Validated | True/False | i3 |
| 308 | PAN Source is Secured NFC Read | True/False | i4 |
| 310 | TTOD Card Cryptogram Validated | True/False | i5 |

400

RECEIVE INTERACTION DATA
402

DETERMINE A MULTIPLE VARIABLE
REGRESSION FORMULA
404

DETERMINE COEFFICIENT OF
DETERMINATION
406

DETERMINE IF COEFFICIENT OF
DETERMINATION IS SATISFACTORY
408

YES             NO

USE THE MULTIPLE VARIABLE
REGRESSION FORMULA TO
DETERMINE RISK
412

ADJUST SLOPE COEFFICIENTS IF
OF DETERMINATION IS NOT
SATISFACTORY
410

|      | i1 | i2 | i1 | i4 | i5 | Prediction | Actual |
|------|----|----|----|----|----|------------|--------|
| 502  | 1  | 0  | 0  | 0  | 0  | 0.0579     | 0.0574 |
| 504  | 1  | 1  | 0  | 0  | 0  | 0.0415     | 0.0411 |
| 506  | 1  | 1  | 1  | 0  | 0  | 0.04       | 0.0399 |
| 508  | 1  | 1  | 1  | 1  | 0  | 0.0332     | 0.033  |
| 510  | 1  | 1  | 1  | 1  | 1  | 0.0122     | 0.0121 |

TOKEN INTERACTION USING MULTIVARIABLE REGRESSION PROCESS

CROSS-REFERENCES TO RELATED APPLICATIONS

None.

BACKGROUND

A token is a substitute for a credential, and can be used in place of the credential to conduct an interaction such as a transaction. Currently, the evaluation of risk associated with a token interaction is based upon binary decisions (e.g., the transaction is authorized or declined based on whether the token cryptogram is validated or not). However, in reality, risk in token transactions is not truly binary because there are often multiple authentication features available, not just token cryptogram validation. It would be desirable provide a more accurate way to assess a risk (e.g., of fraud or other malicious behavior) associated with a token transaction.

Embodiments of the invention address these and other problems, individually and collectively.

SUMMARY

One embodiment of the invention includes a method comprising: a) receiving, by a computer, interaction data related to a plurality of interactions in a time period, the interaction data comprising a plurality of values associated with a plurality of interaction features; b) determining, by a computer, a multiple variable regression formula comprising explanatory variables associated with the plurality of interaction features and slope coefficients associated with the explanatory variables; c) determining, a coefficient of determination associated with the multiple variable regression formula and the interaction data; d) determining, if the coefficient of determination satisfies a threshold and/or is maximized; e) if the coefficient of determination does not satisfy the threshold or is not maximized, then adjusting the slope coefficients and repeating steps b)-d) until the coefficient of determination satisfies the threshold and/or is maximized; and f) if the coefficient of determination does satisfy the threshold or is maximized, then using the multiple variable regression formula to determine risk associated with future interactions.

Another embodiment includes a processing computer comprising: a processor; and a computer readable medium comprising code executable by the processor, to perform operations comprising: a) receiving interaction data related to a plurality of interactions in a time period, the interaction data comprising a plurality of values associated with a plurality of interaction features; b) determining a multiple variable regression formula comprising explanatory variables associated with the plurality of interaction features and slope coefficients associated with the explanatory variables; c) determining, a coefficient of determination associated with the multiple variable regression formula and the interaction data; d) determining, if the coefficient of determination satisfies a threshold and/or is maximized; e) if the coefficient of determination does not satisfy the threshold or is not maximized, then adjusting the slope coefficients and repeating steps b)-d) until the coefficient of determination satisfies the threshold and/or is maximized; and f) if the coefficient of determination does satisfy the threshold or is maximized, then using the multiple variable regression formula to determine risk associated with future interactions.

These and other embodiments are described in further detail below.

BRIEF DESCRIPTION OF THE DRAWINGS

FIG. 5 shows a table of exemplary data comprising predicted risks and interaction data according to the multiple authentication outcome.

DETAILED DESCRIPTION

Figure 1:
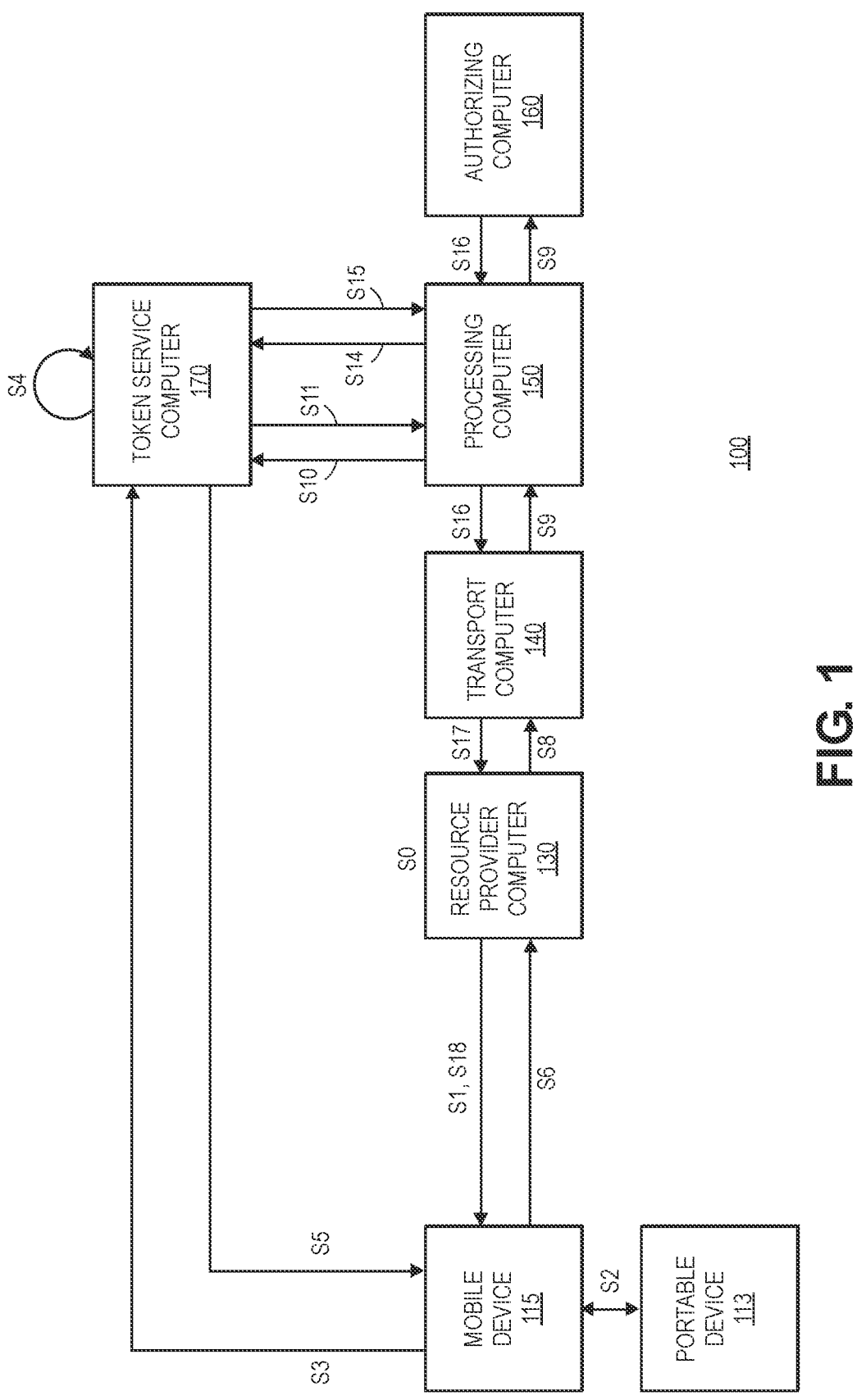
FIG. 1 shows a block diagram of a transaction processing system.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may include a device that is used by a user. In some cases, a user device can be a payment device. The payment device may be a physical object. A payment device may comprise a substrate such as a paper or plastic card, and information that is printed, embossed, encoded, or otherwise included at or near a surface of an object. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "resource provider" may be an entity that can provide a resource such as goods, services, information, and/or access. Examples of resource providers includes merchants, data providers, transit agencies, governmental entities, venue, and dwelling operators, etc.

An "authorizing entity" may be an entity that authorizes a request. Examples of an authorizing entity may be an issuer, a governmental agency, a document repository, an access administrator, etc.

"Payment credentials" may include any suitable information associated with an account (e.g., a payment account and/or payment device associated with the account). Such information may be directly related to the account or may be derived from information related to the account. Examples of payment credentials may include a PAN (primary account number or "account number"), username, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234." In some embodiments, payment credentials can include additional information that may be used for authorizing a transaction. For example, payment credentials can include a cryptogram associated with the transaction.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "transport computer" may refer to an intermediary computer that can transport data. A transport computer can be a computer of an acquirer. An "acquirer" may be an entity that can process interactions on behalf of a resource provider. For example, the acquirer can be a business entity (e.g., a commercial bank) that establishes relationships with resource providers, such that the resource providers can meet transaction processing requirements. Some entities can perform both issuer and acquirer functions. Some embodiments may encompass such single entity issuer-acquirers.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g., a token) that may be associated with the payment account identifier. Further, tokenization may be applied to any other information that may be replaced with a substitute value (i.e., token). Tokenization enhances transaction efficiency and security.

A "token issuer," token provider," "token service system," or "token service computer" can include a system that services tokens. In some embodiments, a token service system can facilitate requesting, determining (e.g., generating) and/or issuing tokens, as well as maintaining an established mapping of tokens to primary account numbers (PANs) in a repository (e.g., token vault). In some embodiments, the token service system may establish a token assurance level for a given token to indicate the confidence level of the token to PAN binding.

The token service system may include or be in communication with a token vault where the generated tokens are stored. The token service system may support token processing of payment transactions submitted using tokens by detokenizing the tokens to obtain the actual PANs. In some embodiments, a token service system may include a token service computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

A "cryptogram" may include encrypted information. For example, a cryptogram can be a set of text encrypted with an encryption key.

Tokens can be used to replace personal information of a user such as account information. Tokenization can reduce the risk of account compromise because a token does not reveal the user's personal information (e.g., account information). If a token is compromised by hacking, social engineering, or man-in-the-middle attacks, the token can be easily replaced or deactivated without affecting the underlying personal information. In addition, the issuance of a token to a user typically requires some previous authentication of the user and/or binding to a user device. This information can be provided to an authorizing entity computer that is authorizing an interaction using the token. Thus, token interactions can provide better security for interactions in different ways.

Embodiments can determine a multiple variable regression formula to predict the risk of future interactions (e.g., future transactions) based on a plurality of interaction (e.g., transaction) features (e.g., authentication processes). Explanatory variables of the multiple regression formula can be associated with the plurality of interaction features, and the response variable can be the risk of a future interaction. A coefficient of determination associated with the multiple regression formula and the interaction data (e.g., transaction data) can be calculated and compared against a threshold to ensure that the multiple variable regression formula is satisfactory. Once it is determined to be satisfactory, the multiple variable regression formula can be used to predict risk associated with a future interaction. Embodiments can predict the risk associated with a future interaction (e.g., a future transaction) by evaluating the multiple variable regression formula with a plurality of values corresponding to the plurality of future interaction features assigned to the explanatory variables.

Some examples of interaction features can include, but are not limited to the following authentication processes: token cryptogram validation, device binding verification, CDCVM (consumer device cardholder verification method) validation, credential is received from an NFC interface, and user portable device cryptogram validation using user communication device.

A token cryptogram validation process can involve the validation of a token cryptogram. A token cryptogram can include a token, an interaction channel, and other information in encrypted form. The token cryptogram can be encrypted using a cryptographic key and can be validated using another cryptographic key corresponding to the cryptographic key. The token cryptogram can also be validated by a token service computer when it confirms that the current interaction corresponds to the interaction channel for the current interaction (e.g., an e-commerce interaction channel indicator corresponds to the current e-commerce transaction).

Device binding verification is a process that leverages a user device (e.g., a mobile phone) as an authentication factor when requesting a token (associated with a credential tied to an underlying account) for that user device. When a user wishes to obtain a token from a token service computer for their user device, the user may be prompted to verify their identity. For example, the token service computer can receive a user secret (e.g., a password) or biometric and can verify it against a stored user secret or biometric. If the user credential verified, a user device identifier (e.g., a phone number) for the user device may then be linked (or bound) to the token. In future transactions where the user device provides the token to a resource provider using the user device, the user device provides the token and the user device identifier to the resource provider which passes this information to the token service computer or other computer in an interaction. The token service computer or other computer can receive the token and user device identifier from the resource provider in the interaction. The token server computer or other computer can rely on the previous authentication as an authentication factor when deciding whether or not to authorize use of the token in the interaction.

Consumer device cardholder verification method (CDCVM) is another authentication process used to verify the identity of the user. A CDCVM process can involve various of authentication including password authentication, biometric authentication, one-time password authentication, etc.

Another interaction feature can be when a credential is received from an NFC (near field communications) interface in an interaction. In some token transactions, the payment credential (e.g., PAN) is provided to the access device using a secure NFC interface on an access device such as a POS terminal. The user may tap the user device (e.g., contactless payment card, mobile device with mobile wallet application, or other PAN source) to the access device to provide the payment credential to the access device. If the user device provides the credential to the access device using secure NFC, it can indicate that the user device was physically present during payment and that the transaction was conducted using a secure chip (as opposed to a less secure magnetic stripe).

Another interaction feature can be when a user portable device cryptogram is validated in a tap to user device process. In this case, both a portable device including cryptographic keys and a user device are operated by a user. One example of this type of interaction is a "tap to your own device" (TTOD) process. This is a process where a user's portable device (e.g., contactless payment card) is tapped to another user device (e.g., mobile device with secure kernel). The user device receives a credential (e.g., PAN and expiration date) and a cryptogram from the portable device. Because the user's portable device and user device are present in a TTOD process, a processing computer or authorizing entity that receives an authorization request message with an indication that the transaction was initiated using both the user's portable device and the user's user device can be assured that the transaction is authentic, since only a legitimate user would be in possession of both the portable device and the user device.

The greater the number of interaction factors that are evaluated in an interaction, the greater the assurance that interaction is legitimate and not fraudulent.

FIG. 1 shows a block diagram of a token processing system 100. The token processing system may be used to perform interactions such as payment transactions.

The token processing system 100 comprises a mobile device 115 that can interact with an access device 125. The mobile device 115 can be operated by a user (not shown), and the user can also operate a portable device 113, which may be a card such as a payment card (e.g., a credit, debit, or stored value card). The access device 125 may communicate with an authorizing computer 160 via a resource provider computer 130, a transport computer 140, and a processing computer 150. The mobile device 115 may also communicate with the token service computer 170.

The resource provider computer 130 may be associated with a merchant. The resource provider computer 130 may be a computer in communication with the access device 125, or it can be a remote server computer that operates a web site operated by the merchant. The resource provider computer 130 may be configured to generate an authorization request message for a transaction that is initiated by the user.

The transport computer 140 may be operated by an acquirer. An acquirer is typically a system for an entity (e.g., a bank) that has a business relationship with a particular merchant, a wallet provider or another entity. The transport computer 140 may be communicatively coupled to the resource provider computer 130 and the processing computer 150 and may issue and manage an account of the merchant. In some embodiments, the transport computer 140 may forward the authorization request message to the processing computer 150 and the authorization response message to the resource provider computer 130 during a transaction to confirm processing of a payment transaction.

The processing computer 150 may be in a payment processing network that is configured to provide authorization services, and clearing and settlement services for payment transactions. The processing computer 150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet. In some embodiments, the processing computer 150 may forward an authorization request received from the transport computer 140 to the authorizing computer 160 via a communication channel. The processing computer 150 may further forward an authorization response message received from the authorizing computer 160 to the transport computer 140.

The authorizing computer 160 may be operated by an account issuer. Typically, the issuer is an entity (e.g., a bank) that issues and maintains an account of the user 110. The account may be a credit, debit, prepaid, or any other type of account.

The token service computer 170 can obtain tokens (e.g., generate or retrieve tokens), and have a database which maps tokens to credentials, and optionally to device identifiers for devices that are bound to the tokens. The token service computer 170 can also have a token exchange module for exchanging a credential for a token, and vice-versa.

Each of the computers and devices shown in FIG. 1 may communicate using any suitable communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

To illustrate, steps in a process flow of a user performing a payment transaction can be described with reference to FIG. 1. The token processing system in FIG. 1 is used in the context of resource access such as access to goods and services provided by a resource provider such as a merchant. However, other types of token processing systems can be used. For example, the token processing system can be used to obtain access to sensitive data in a database or secure access to a location.

Methods describing the use of all of the above described interaction (e.g., authentication) features can be described with reference to FIG. 1. Other embodiments can include more or less interaction features than the ones described with respect to FIG. 1. For example, five specific interaction features are described above, but other embodiments include four, three, two, or even one of the interaction features, or other interaction features. As an illustration, the description below mentions the process of obtaining a credential such as a PAN from the portable device 113 in a TTOD process. However, in other embodiments, the mobile device may store the credential and no TTOD process is performed. Further, in the described TTOD process, the resource provider computer 130 can operate a resource provider Website such as a merchant Website. The TTOD process can be characterized as a remote transaction, since the user that is conducting the interaction is remotely located with respect to the resource provider computer 130. However, in other interaction flows, embodiments of the invention can include in person transactions where the user is at a resource provider location such as a merchant location. The resource provider location can have an access device (e.g., a POS terminal), which can interact with a mobile device or portable device that can be associated with the user.

At step S0, after goods or services are selected by the user operating the mobile device 115 at a resource provider operating the resource provider computer 130 that has a resource provider Website. In other embodiments, the resource provider computer 130 can be an application server that services a resource provider application on the mobile device 115. The resource provider computer 130 may generate transaction-specific information including, but not limited to, resource provider data such as a merchant identifier, a transaction amount, a transaction timestamp, etc. This information may be provided to the mobile device 115 in step S1.

In some embodiments, at step S2, the mobile device 115 may optionally prompt the user to tap their portable device 113 against the mobile device 115. In doing so, the portable device 113 and the mobile device 115 can be in communication with each other via a short range communication protocol such as NFC. The mobile device 115 can transmit some of the transaction information (e.g., the transaction amount) to the portable device 113. The portable device 113 can then generate a card cryptogram including the transaction information and the credential stored in the mobile device 115 using a cryptographic key (e.g., a symmetric key). The corresponding cryptographic key may be stored at the processing computer 150 and/or the authorizing computer 160. The portable device 113 can then transmit the cryptogram and the credential and optionally some of the transaction information back to the mobile device 115. The cryptogram in this situation can be a TTOD card cryptogram since the user's portable device 113 was tapped to the user's mobile device 115. As will be described below, the card cryptogram can be transmitted in an authorization request message, and can be validated by the processing computer 150 or the authorizing computer 160. The NFC interaction between the mobile device 115 and the portable device 115 can satisfy the interaction feature "credential source is secured via an NFC read."

At step S3, the mobile device 115 may transmit the information from the resource provider computer 130 and information from the mobile device 115 (e.g., a mobile device identifier, a real account identifier, a request time, the signed data from the portable device 113, etc.) to the token service computer 170. For example, the mobile device 115 may send this information in a token request message to the token service computer 170.

Prior to or concurrently with sending the token request message, at step S4, the token service computer 170 can authenticate the mobile device 115 and/or the user operating the mobile device 115. For example, token service computer 170 may request a secret (e.g., a static or one time password) from the user operating the mobile device 115. The user can transmit the secret to the token service computer 170 along with a mobile device identifier. The token service computer 170 can then compare the received secret with a stored secret, and authenticate the user. Once the user is authenticated, the token service computer 170 can store an indication that the user associated with the mobile device 115 has been authenticated and the user authentication is then bound to a token and the mobile device identifier. The binding of the token to the credential and the mobile device 115 can be verified by the token service computer 170, and this can correspond to a "device binding verified" interaction feature.

After receiving the token request message from the mobile device 115 and authenticating the user and/or the mobile device 115 operated by the user, the token service computer 170 may obtain (e.g., generate) a token, a token expiration date, and a token cryptogram for the mobile device 115. The token cryptogram may be derived from information such as the token, the transaction-specific information including the merchant ID, a transaction channel identifier (an e-commerce channel identifier, a user present channel identifier, etc.) the transaction amount, the locations of the user and the merchant, a time stamp, etc. Such information can be encrypted using another cryptographic key. The token may be associated with a PAN of a payment account belonging to the user 110 of the mobile device 115. The token cryptogram included in an authorization request message that is later transmitted by the access device 125 to the processing computer 150. The token service computer 170 can validate the token cryptogram using a cryptographic key corresponding to the cryptographic key used to generate the token cryptogram. This can correspond to the interaction feature "token cryptogram validated."

The token service computer 170 may transmit the token for the mobile device 115, the token expiration date, and the token cryptogram back to the mobile device 115 in step S5.

At step S6, after the mobile device 115 receives the token and the cryptogram, the mobile device 115 can provide the token, the token cryptogram, and the signed data from the portable device 113 to resource provider computer 130. t Before or after step S6, the mobile device 115 may request that the user authenticate themselves using a secret or biometric. In some embodiments, the user can enter the secret or biometric into the mobile device 115, and the mobile device 115 may verify the entered secret or biometric using an enrolled secret or biometric that is stored in the mobile device 115, or possibly the portable device 113. Upon verification of the secret or biometric, the mobile device 115 can generate a "CDCVM validated" indicator.

After step S6, the resource provider computer 130 can generate an authorization request message. The authorization request message can include at least the token, the expiration date, the transaction amount, a token cryptogram, a "device binding verified" indicator, a "credential source secured via NFC read" indicator, the "CDCVM validated" indictor, and a card cryptogram.

In step S8, and S9, the resource provider computer 130 may send the authorization request message to the processing computer 150 via the transport computer 140 and the resource provider computer 130. The processing computer 150 can validate the card cryptogram using an appropriate cryptographic key.

At step S10, the processing computer 150 may transmit the authorization request message to the token service computer 170 or may provide the token and the token cryptogram to the token service computer 170. The token service computer 170 may then validate the token cryptogram, and may also determine the real account identifier from the token. For example, the token service computer 170 may decrypt the cryptogram and can recover the interaction channel indicator in the cryptogram and compare it to the interaction channel in which the current interaction is conducted.

At step S11, if the token service computer 170 validates the cryptogram, the token service computer 170 can return the real account identifier associated with the token to the processing computer 150 along with a "token cryptogram validated" indicator. If the token service computer 170 did not modify the authorization request message to include the token, the processing computer 150 may modify the authorization request message to include the token.

After step S11, the processing computer 150 can determine a score for the interaction using at least a multiple variable regression formula. The multiple variable regression formula is based on the plurality of values related to the plurality of authentication outcomes associated with interaction features to determine a risk associated with the current interaction (e.g., transaction). Stated differently, the processing computer 150 can determine a risk associated with the interaction based on the interaction features that were used in the current interaction and the multiple variable regression formula. The explanatory variables in the formula may be assigned values of "1" to indicate that the corresponding interaction feature was present or "0" if the interaction feature was not present. The response variable can be a risk score associated with the interaction. The creation and use of the multiple variable regression formula is described in further detail below. In this example transaction, all five of the interaction features are present.

At step S12, the processing computer 150 may then modify the authorization request message to include the score. The processing computer 150 can then transmit the authorization request message to the authorizing computer 160. After receiving the authorization request message, the authorizing computer 160 may then determine if the transaction is authorized. It may do this by determining if there are sufficient funds or credit in the account associated with the account identifier in the authorization request message. It may also evaluate the score generated using the multiple regression formula and may conduct any independent fraud screening on the transaction.

At step S13, the authorizing computer 160 may transmit an authorization response message comprising the account identifier back to the processing computer 150. At step S14, the processing computer 150 can then transmit the authorization response message or the information therein to the token service computer 170. At step S15, the token service computer 170 may then return the authorization response message including the token or the token itself.

If the processing computer 150 only receives the token, it may then modify the authorization response message to include the token and may transmit the authorization response message comprising the token to the transport computer 140 in step S16. In steps S17 and S18, the authorization response message comprising the token is transmitted to the resource provider computer 130. The resource provider may then store the token instead of the real account identifier. This improves data security since the token is stored at the resource provider instead of the real account identifier. If the resource provider experiences a data breach and the token is improperly obtained, it is of limited or no use.

At the end of the day or at any other suitable time period, a clearing and settlement process, as is known in the art, may be performed between the transport computer 140, the processing computer 150, and the authorizing computer 160.

Figure 2A:
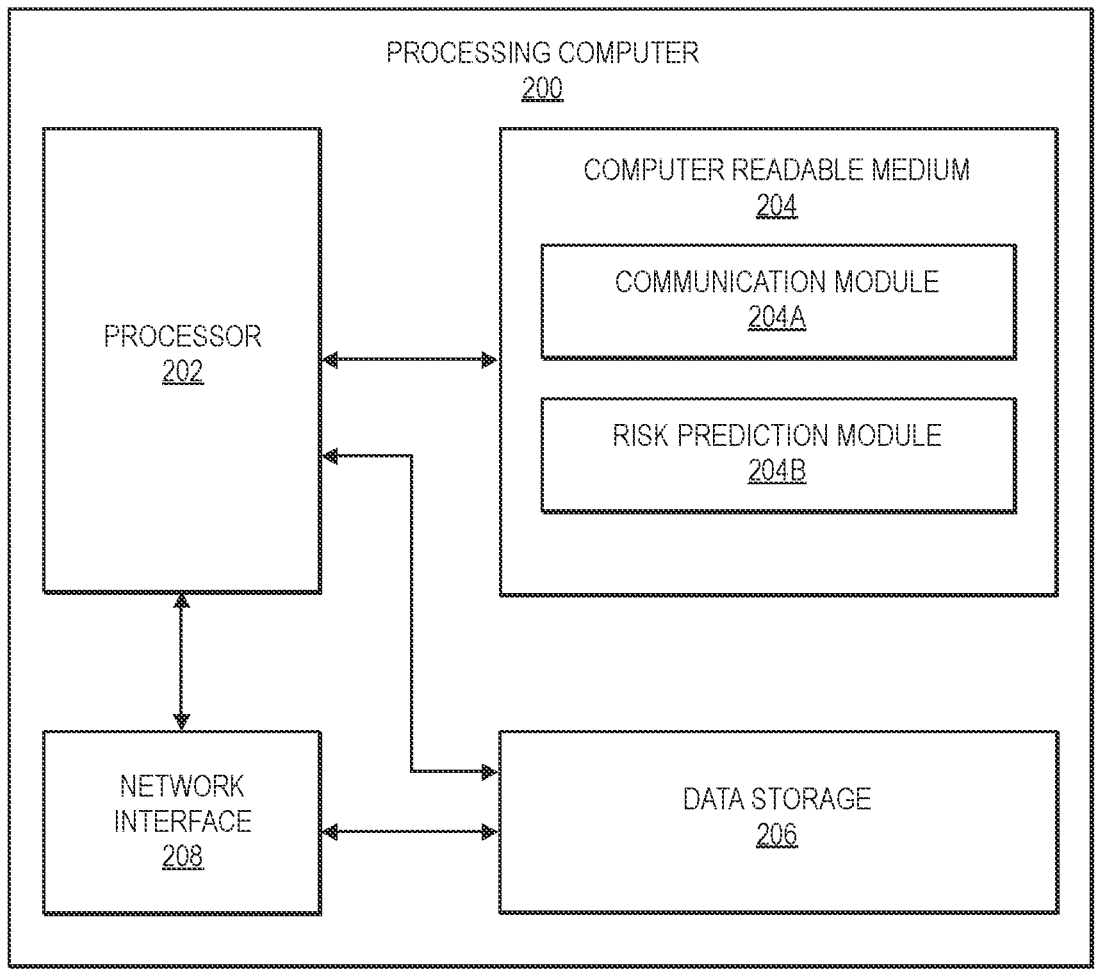
FIG. 2A shows a block diagram of a processing computer according to some embodiments.

FIG. 2A shows the architecture of a processing computer 200 according to some embodiments. The processing computer 200 may comprise a processor 202, which may be coupled to a computer readable medium 204, a data storage 206, and a network interface 208. The computer readable medium 204 may comprise a communication module 204A and a risk prediction module 204B.

The data storage 206 can be used to store data and code. For example, the data storage 206 can store interaction data, risk predictions, multiple variable regression formulas, coefficients of determination, etc. It can also store addresses associated with authentication server computers, authorizing entity computers, and resource provider computers. The data storage 206 may be coupled to the processor 202 internally or externally (e.g., cloud based data storage), and may comprise any combination of volatile and/or non-volatile memory, such as RAM, DRAM, ROM, flash, or any other suitable memory device.

The computer readable medium 204 may comprise code executable by the processor 202 to perform operations comprising: receiving interaction data related to a plurality of interaction in a time period; determining a multiple variable regression formula; determining a coefficient of determination associated with the multiple variable regression formula and the interaction data; determining if the coefficient of determination satisfies a threshold or is maximized; if the coefficient of determination does not satisfy the threshold or is not maximized, then adjusting the slope coefficients; and if the coefficient of determination does satisfy the threshold or is maximized, then using the multiple variable regression formula to determine risk associated with future interactions.

The computer readable medium 204 may comprise software modules such as a communication module 204A and a risk prediction module 204B. The communication module 204A may comprise code executable by the processor 202 to enable the processing computer 150 to transmit and receive information such as authorization request messages, authorization response messages, and interaction data. The risk prediction module 204B may comprise code executable by the processor 202 to enable the processing computer 150 to determine, optimize, and evaluate a multiple variable regression formula based on interaction data.

Figure 2B:
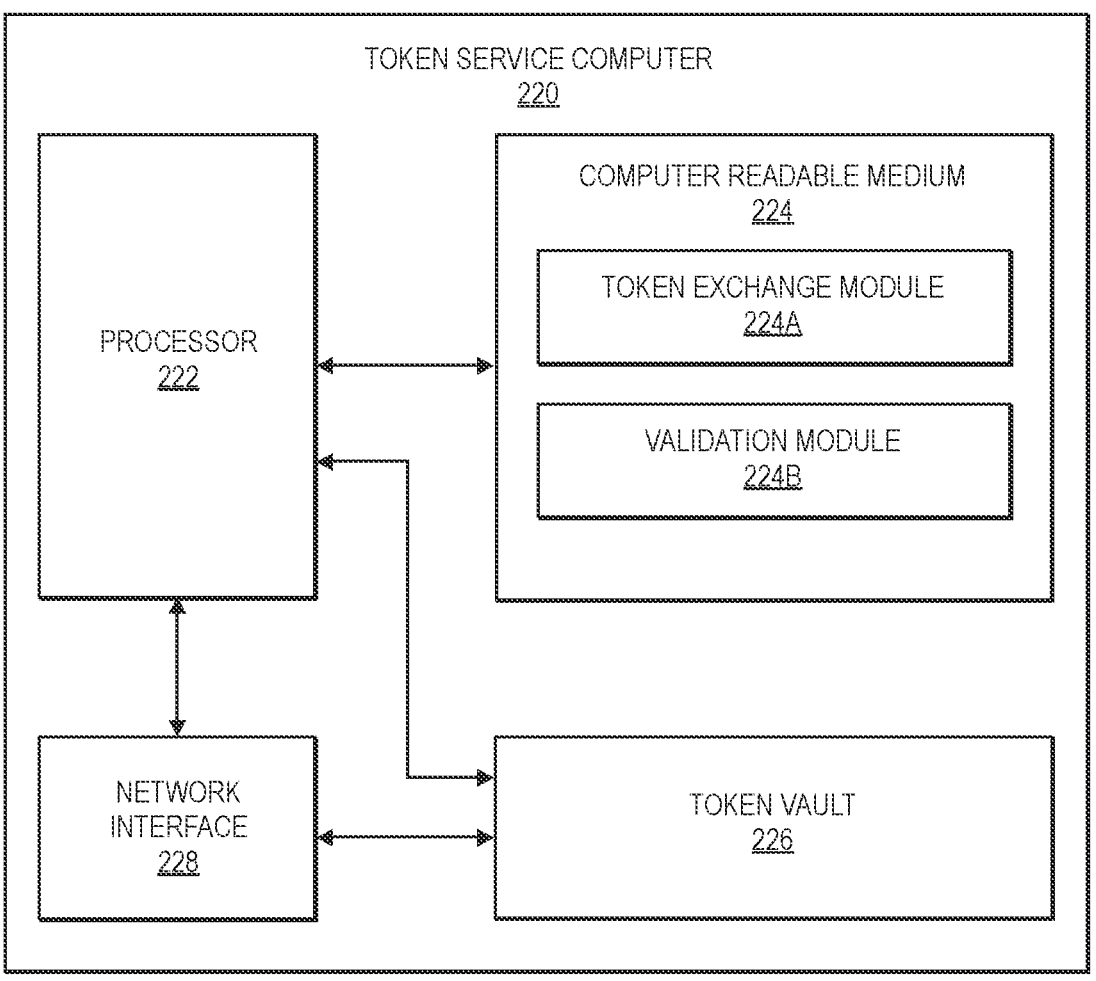
FIG. 2B shows a block diagram of a token service computer according to embodiments.

FIG. 2B shows a token service computer 220. The token service computer 220 includes a processor 222 and a computer readable medium 224, a token vault 226, and a network interface 228 coupled to the processor 222.

The computer readable medium 224 may comprise a token exchange module 224A and a validation module 224B.

The token vault 226 may store tokens and their associated credentials in a database. The token vault 226 may store data in a database such as an Oracle™ database.

The tokenization exchange module 224A may comprise code that causes the processor 222 to provide access tokens. For example, the token exchange module 224A may contain logic that causes the processor 222 to generate a payment token and/or associate the payment token with a set of payment credentials. A token record may then be stored in a token record database indicating that the payment token is associated with a certain user or a certain set of payment credentials.

The validation module 224B may comprise code that causes the processor 222 to validate token requests before a payment token is provided. For example, validation module 224B may contain logic that causes the processor 222 to confirm that a token request message is authentic by decrypting a cryptogram included in the message, by confirming that the payment credentials are authentic and associated with the requesting device, by assessing risk associated with the requesting device.

Figure 2C:
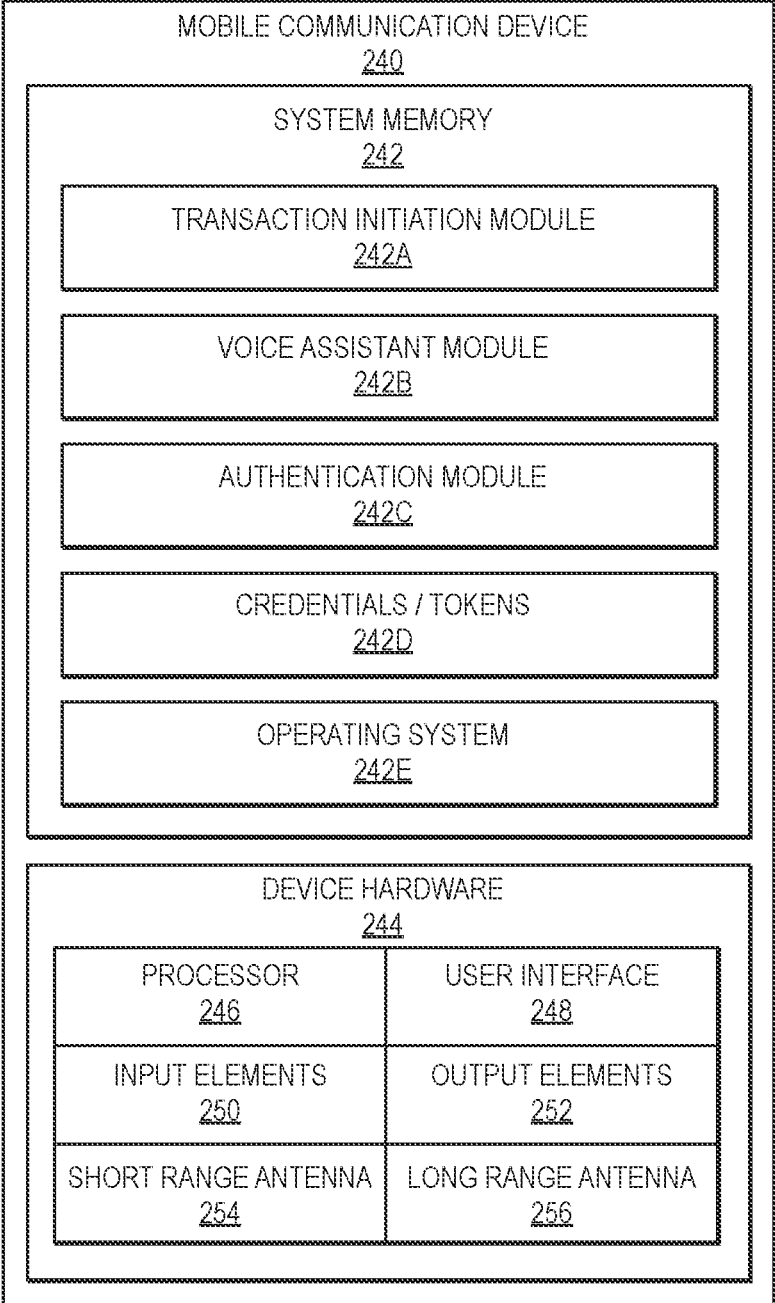
FIG. 2C shows a block diagram of a mobile communication device according to embodiments.

FIG. 2C illustrates a mobile communication device 240 according to an embodiment. Mobile communication device 240 may include device hardware 244 coupled to a system memory 242.

Device hardware 244 may include a processor 246, a short range antenna 254, a long range antenna 256, input elements 250, a user interface 248, and output elements 252 (which may be part of the user interface 248). Examples of input elements may include microphones, keypads, touchscreens, sensors, etc. Examples of output elements may include speakers, display screens, and tactile devices. The processor 246 can be implemented as one or more integrated circuits (e.g., one or more single core or multicore microprocessors and/or microcontrollers), and is used to control the operation of mobile communication device 240. The processor 246 can execute a variety of programs in response to program code or computer-readable code stored in the system memory 242, and can maintain multiple concurrently executing programs or processes.

The long range antenna 256 may include one or more RF transceivers and/or connectors that can be used by mobile communication device 240 to communicate with other devices and/or to connect with external networks. The user interface 248 can include any combination of input and output elements to allow a user to interact with and invoke the functionalities of mobile communication device 240. The short range antenna 809 may be configured to communicate with external entities through a short range communication medium (e.g., using Bluetooth, Wi-Fi, infrared, NFC, etc.). The long range antenna 819 may be configured to communicate with a remote base station and a remote cellular or data network, over the air.

The system memory 242 can be implemented using any combination of any number of non-volatile memories (e.g., flash memory) and volatile memories (e.g., DRAM, SRAM), or any other non-transitory storage medium, or a combination thereof media. The system memory 242 may store computer code, executable by the processor 805, for performing any of the functions described herein.

The system memory 242 may also store a transaction initiation module 242A, a voice assistant module 242B, an authentication module 242C, credentials 242D, and an operating system 242E, The transaction initiation module 242A may include instructions or code initiating and conducting a transaction with an external device such as an access device or a processing computer. It may include code, executable by the processor 246, for generating and transmitting authorization request messages, as well as receiving and forwarding authorization response messages. It may also include code, executable by the processor 246, for forming a local connection or otherwise interacting with an external access device. The voice assistant module 242B may comprise code, executable by the processor 246, to receive voice segments, and generate and analyze data corresponding to the voice segments. The authentication module 242C may comprise code, executable by the processor 246, to authenticate a user. This can be performed using user secrets (e.g., passwords) or user biometrics.

System memory 242 may also store credentials and/or tokens 242D. Credentials may also include information identifying the mobile communication device 240 and/or the user of the mobile communication device 240. Examples of credentials may include a public key associated with the mobile communication device 240 and/or a user of the mobile communication device 240, a digital signature (e.g., the public key of the mobile communication device 240 signed by a key of the authentication system), payment credentials, biometric data (e.g., biometric samples or templates), etc.

Figure 3:
FIG. 3 shows a table of variable assignments for multiple authentication features of a token transaction.

FIG. 3 shows a table of variable assignments for an exemplary multiple authentication outcome of a token transaction.

A multiple authentication outcome can indicate which authentication features were present and successful, as well as which were not supported, in a token transaction. In this example, the multiple authentication outcome can comprise five values i1, i2, i3, i4, and i5, which respectively indicate the true or false outcome of token cryptogram verified 302, device binding verified 304, CDCVM validated 306, PAN source is secured NFC read 308, and TTOD card cryptogram verification 310. To reflect five authentication features corresponding to five explanatory variables, embodiments can determine a multiple variable regression formula with the following format:

$y_i = \beta_0 + \beta_1 x_{i1} + \beta_2 x_{i2} + \beta_3 x_{i3} + \beta_4 x_{i4} + \beta_5 x_{i5} + \varepsilon$, wherein $y_i$ is the predicted risk, $\beta_0$ is a y-intercept, $\varepsilon$ is a residual term, and $\beta_1$, $\beta_2$, $\beta_3$, $\beta_4$, $\beta_5$ are slope coefficients for each explanatory variable $x_{i1}$, $x_{i2}$, $x_{i3}$, $x_{i4}$, $x_{i5}$.

During evaluation of the multiple variable regression formula, the values of explanatory variables $x_{i1}$, $x_{i2}$, $x_{i3}$, $x_{i4}$, $x_{i5}$ can be determined by the five values i1, i2, i3, i4, i5, respectively. The explanatory variables can be "1" to indicate true, that the respective authentication method is verified, or "0" to indicate false, that it is not present or not verified. For example, if the token cryptogram is used and validated in a token interaction, then i1 can be true, and the value "1" can be assigned to $x_{i1}$ in the evaluation of the multiple variable regression formula. The same logic can apply to the remaining explanatory variables. It should be noted that the number and type of authentication features available can vary, and embodiments are not limited to a five variable regression formula.

Embodiments fit interaction data using a multiple variable regression formula in order to predict risk associated with a future interaction (e.g., token transaction). A well-fitting formula can predict or come close to predicting the interaction data. One way to measure how well the multiple variable regression formula fits the interaction data is with a coefficient of determination. Embodiments can determine slope coefficients (e.g., $\beta_1$, $\beta_2$, $\beta_3$, $\beta_4$, $\beta_5$) such that the residuals between the predicted data and the interaction data is minimized, or equivalently, the coefficient of determination is sufficiently maximized or satisfies a threshold. If the coefficient of determination is not sufficiently maximized or satisfies a threshold, embodiments can iteratively adjust the slope coefficients and recalculate the coefficient of determination until the coefficient of determination is sufficiently maximized. Once the coefficient of determination is sufficiently maximized or satisfies a threshold, the multiple variable regression formula can be evaluated to predict the risk of a future interaction based on its interaction features. After a period of time, embodiments may continue to receive updated interaction data and determine an updated multiple variable regression formula using the same method.

Figure 4:
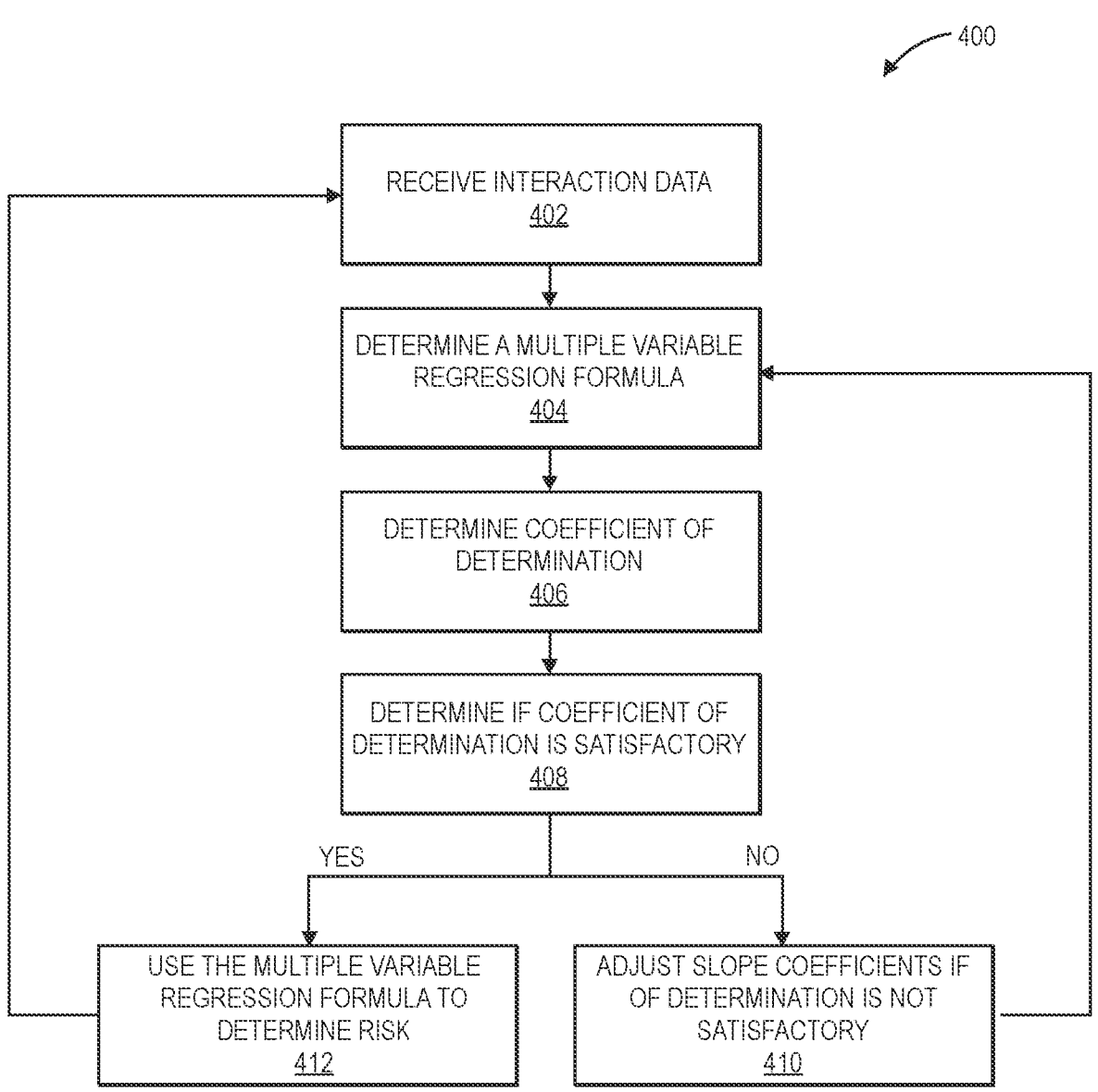
FIG. 4 shows a flow diagram of a process according to embodiments.

FIG. 4 shows a flow diagram of a method 400 for determining a multiple variable regression formula to predict risk associated with future interactions.

At step 402, the computer can receive interaction data related to a plurality of interactions in a time period. The interaction data can be data sampled from a plurality past interactions (e.g., past transactions) over the time period and can comprise a plurality of values associated with a plurality of interaction features (e.g., authentication features). For example, the plurality of interactions can relate to a plurality of payment transactions. Each payment transaction may have associated with it one or more of the authentication features described above.

After receiving the interaction data, the computer can determine a multiple variable regression formula at step 404. The multiple variable regression formula can comprise explanatory variables that reflect the plurality of interaction features and slope coefficients associated with the explanatory variables. The multiple variable regression formula can have the following format: $y_i = \beta_0 + \beta_1 x_{i1} + \beta_2 x_{i2} + \beta_3 x_{i3} + \beta_4 x_{i4} + \beta_5 x_{i5} + \varepsilon$, wherein $y_i$ is the predicted risk, $\beta_0$ is a y-intercept, $\varepsilon$ is a residual term, and each $\beta_p$, is a slope coefficient for each explanatory variable $x_{ip}$ (p representing the number of an explanatory variable, $p \neq 0$). The magnitude of slope coefficient $\beta_p$ can indicate the weight of impact that explanatory variable $x_{ip}$ has on the predicted risk $y_i$. For a unit increase in explanatory variable $x_{ip}$, the predicted risk $y_i$ changes by slope coefficient $\beta_p$. The computer can determine values $\beta_0$, $\beta_1$, $\beta_2$, $\beta_3$, $\beta_4$, $\beta_5$, $\varepsilon$, to formulate the multiple variable regression formula.

As an illustrative example, the interaction can be a token transaction (e.g., a payment transaction that uses a payment token to conduct the transaction), the plurality of interaction features may be a plurality of authentication features and the plurality of values may indicate whether or not the interaction features are present or not. (e.g., "true" if an authentication feature is used or "false" if the authentication feature is not used).

FIG. 5 shows a table of exemplary data comprising predicted risks and interaction data according to multiple authentication outcomes. Each row of the table displays a transaction type based on its multiple authentication outcome. For example, row 502 with the multiple authentication outcome "1-0-0-0-0" can be for the group of token transactions wherein only token cryptogram verification was performed, and none of the other authentication features were performed.

Each value in the actual column 514 can be a historical rate of fraudulent transactions for a particular multiple authentication outcome. The value in the first row of the actual column, 0.0574, can indicate that for token transactions wherein only token cryptogram verification was used, the actual rate of fraud was 0.0574. The predicted column 512 can be the calculated risk according to the multiple variable regression formula.

An exemplary multiple variable regression formula according to the transaction data in the actual column 514 of FIG. 5 can comprise y-intercept $\beta_0$=0.092; slope coefficients $\beta_1$=−0.032, $\beta_2$=−0.0164, $\beta_3$=−0.0015, $\beta_4$=−0.0068, $\beta_5$=−0.021, and a residual term $\epsilon$=−0.0021; yielding the following multiple variable regression formula:

$$y_i = 0.092 - 0.032x_{i1} - 0.0164x_{i2} - 0.0015x_{i3} - 0.0068x_{i4} - 0.021x_{i5} - 0.0021.$$

Any suitable method as is known in the art may be used to determine the slope coefficients. For example, the server computer can determine 100 different combinations of slope coefficients. For each combination, the server computer can compute a coefficient of determination. The server computer can select the combination of slope coefficients with the highest coefficient of determination.

Value 516, 0.0579, in the first row of the predicted column can be obtained by evaluating the multiple variable regression formula using $x_{i1}$=1, $x_{i2}$=0, $x_{i3}$=0, $x_{i4}$=0, $x_{i5}$=0. Value 516 can indicate that the multiple variable regression formula predicts a risk of 0.0579 for token transactions wherein only token cryptogram verification is present.

As an example, assume that the data set being evaluated included 10,000 transactions that included the interaction features in row 502 in FIG. 5. The risk that is predicted for the 10,000 transactions using the above-described formula is 0.0579 (i.e., 579 of the 10000 transactions were predicted to be fraudulent). The actual rate of fraud for those 10,000 transactions was 0.0574 (i.e., 574 of the 10,000 transactions were actually fraudulent).

At step 406, once the computer has determined a multiple variable regression formula, the computer can calculate a coefficient of determination. The coefficient of determination can be a measure of how well the multiple regression formula fits the interaction data, ranging from 0 to 1. During calculation of the coefficient of determination, the risk of future interactions as predicted by the multiple variable regression formula is compared to the interaction data. Optimally, the coefficient of determination is 1, meaning that the multiple variable regression formula can perfectly predict the interaction data. In contrast, a low coefficient of determination may indicate that the multiple variable regression formula does not fit the interaction data and may need to be refined.

Any suitable method as is known in the art may be used to calculate the coefficient of determination. One method may involve dividing the sum of squared residuals by the total sum of squares, and subtracting the quotient from 1. For example, the following formula can be used to calculate the coefficient of determination:

$$R^2 = 1 - \frac{SSR}{TSS}$$

wherein SSR is the sum of squared residuals and TSS is the total sum of squares. Equivalently, the formula may be:

$$R^2 = 1 - \frac{\sum (y_i - \hat{y}_i)^2}{\sum (y_i - \bar{y})^2}$$

wherein $y_i$ is the actual risk of the interaction (e.g., given by the data), $\hat{y}_i$ is the predicted risk of the interaction, $\bar{y}$ is the mean risk, and the summation is over all interactions i in the interaction data.

At step 408, the computer can determine if the coefficient of determination is sufficiently maximized and/or satisfied a threshold value. Some embodiments may set a threshold value to determine whether or not the coefficient of determination is sufficient to proceed to step 412. Alternatively, or additionally, the computer can determine a maximum coefficient of determination based upon past coefficient of determination values. A coefficient of determination could be calculated, and it can be evaluated to see if it is a maximum value relative to previously calculated coefficient of determinations. The maximum value may or may not exceed the threshold value.

If the coefficient of determination does not satisfy the threshold, embodiments may determine that the multiple regression formula does not suitably predict the interaction data. Then, at step 410 the computer can attempt to increase the coefficient of determination by adjusting the slope coefficients. Once the computer adjusts the slope coefficients, the computer can restart the process beginning at step 406. The computer can determine an updated multiple variable regression formula comprising the adjusted slope coefficients, determine an updated coefficient of determination for the updated multiple variable regression formula, and determine if the updated coefficient of determination. The computer may repeat the process comprising adjusting the slope coefficients and performing steps 406 and 408 until the coefficient of determination satisfies the threshold. Once the coefficient of determination satisfies the threshold, the computer may proceed to perform step 412.

If the coefficient of determination does satisfy the threshold, embodiments may determine that the multiple variable regression formula does suitably predict the possibility of fraud for subsequent interactions. Next, at step 412, the computer can use the multiple variable regression formula to determine risk associated with future interactions.

Embodiments of the invention have a number of technical advantages. For example, embodiments of the invention may directly impact the rate of fraudulent interactions. When embodiments determine that the risk of fraud or other malicious behavior associated with a future interaction is high, it may serve as a warning for fraud and warrant extra caution or risk elimination techniques. In effect, there may be a reduction in the rate of fraudulent interactions. For example, if the interaction is a transaction, embodiments may use the multiple variable regression formula to determine the risk associated with a future transaction. If embodiments determine that the risk associated with the future transaction is high, an authorizing entity may investigate the transaction or refuse to authorize it. As a result, the rate of fraudulent transactions may decrease. In this way, the actual risk of an interaction may change over time while using embodiments.

To address this, embodiments can update the multiple variable regression formula to reflect the most recent interaction data. After a period of time, embodiments may repeat the method 400 beginning at step 402 and the server computer can receive additional interaction data. The multiple regression formula can be updated to comprise updated slope coefficients that reflect the additional interaction data.

Once the multiple variable regression formula is generated, it can be used in conjunction with the process in FIG. 1 as described above.

Embodiments have a number of technical advantages. Embodiments provide a method for evaluating risk of an interaction that may depend on a plurality of interaction features. In comparison to binary risk evaluation techniques, embodiments can allow for more accurate risk evaluation and better identification of fraudulent interactions.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

receiving, by a computer from a resource provider computer, an authorization request message comprising an amount, a token, a token cryptogram, and a plurality of values related to a plurality of authentication outcomes in a transaction between a user and a resource provider after the user provides the token to the resource provider computer via a mobile device or a portable device;

cryptographically validating the token cryptogram and determining that an interaction channel indicator in the token cryptogram is consistent with a current interaction channel for the transaction;

after the token cryptogram is cryptographically validated and determining that the interaction channel indicator in the token cryptogram is consistent with the current interaction channel for the transaction, then detokenizing the token, by the computer using a token service computer, to obtain a real credential associated with the token;

determining, by the computer, a risk value associated with the transaction using a modified multiple variable regression formula based on the plurality of values related to the plurality of authentication outcomes, wherein the modified multiple variable regression formula is formed by a process including:

a) receiving, by the computer, interaction data related to a plurality of interactions in a time period, the interaction data comprising a plurality of values associated with a plurality of interaction features, b) determining, by the computer, a multiple variable regression formula comprising explanatory variables associated with the plurality of interaction features and slope coefficients associated with the explanatory variables, c) determining, a coefficient of determination associated with the multiple variable regression formula and the interaction data, d) determining, if the coefficient of determination satisfies a threshold and/or is maximized, and e) if the coefficient of determination does not satisfy the threshold or is not maximized, then adjusting the slope coefficients and repeating steps b)-d) until the coefficient of determination satisfies the threshold and/or is maximized to form the modified multiple variable regression formula;

modifying, by the computer, the authorization request message to include the amount, the real credential, and the risk value;

transmitting, to an authorizing computer, the authorization request message comprising the amount, the real credential, and the risk value, wherein the authorizing computer authorizes the transaction based on the amount, the real credential, and the risk value;

receiving, by the computer from the authorizing computer, an authorization response message comprising the real credential and an authorization indicator;

modifying, by the computer, the authorization response message to include the token; and transmitting, by the computer, the authorization response message comprising the token and the authorization indicator to the resource provider computer, wherein the resource provider stores the token instead of the real credential, thereby protecting the real credential from obtaining the real credential in a data breach of the resource provider computer.

2. The method of claim 1, further comprising:

g) receiving, by the computer, additional interaction data related to a plurality of additional interactions in a subsequent time period, the additional interaction data comprising an additional plurality of values associated with the plurality of interaction features;

h) determining, by the computer, an updated multiple variable regression formula comprising the explanatory variables associated with the plurality of interaction features and updated slope coefficients associated with the explanatory variables;

i) determining, a coefficient of determination associated with the updated multiple variable regression formula and the interaction data;

j) determining, if the coefficient of determination satisfies an updated threshold and/or is maximized;

k) if the coefficient of determination does not satisfy the updated threshold or is not maximized, then adjusting the updated slope coefficients and repeating steps i) and k); and l) and if the coefficient of determination does satisfy the threshold or is maximized, then using the updated multiple variable regression formula to determine risk associated with additional future interactions.

3. The method of claim 1, wherein the multiple variable regression formula further comprises a residual term and a y-intercept term.

4. The method of claim 1, wherein the multiple variable regression formula has the format $y_i = \beta_0 + \beta_1 x_{i1} + \beta_2 x_{i2} + \beta_3 x_{i3} + \beta_4 x_{i4} + \beta_5 x_{i5} + \varepsilon$, wherein $y_i$ is the predicted risk, $\beta_0$ is a y-intercept, $\varepsilon$ is a residual term, and $\beta_1$, $\beta_2$, $\beta_3$, $\beta_4$, $\beta_5$ are slope coefficients for each explanatory variable $x_{i1}$, $x_{i2}$, $x_{i3}$, $x_{i4}$, $x_{i5}$.

5. The method of claim 1, wherein the interaction data further comprises historical transaction data.

6. The method of claim 1, wherein the plurality of interactions are a plurality of token transactions, the interaction data is transaction data, and the plurality of interaction features are related to a plurality of authentication features.

7. The method of claim 6, wherein the plurality of authentication features comprise one of more of token cryptogram validation, device binding verification, CDCVM validation, credential source secure NFC read, and tap to your own device card validation.

8. The method of claim 7, wherein the plurality of values are binary values.

9. The method of claim 1, wherein the computer is a processing computer.

10. The method of claim 1, wherein the real credential is a primary account number.

11. The method of claim 6, wherein the transaction is a payment transaction.

12. A processing computer comprising:

a processor; and a computer readable medium comprising code executable by the processor, to perform operations comprising:

receiving, from a resource provider computer, an authorization request message comprising an amount, a token, a token cryptogram, and a plurality of values related to a plurality of authentication outcomes in a transaction between a user and a resource provider after the user provides the token to the resource provider computer via a mobile device or a portable device;

cryptographically validating the token cryptogram and determining that an interaction channel indicator in the token cryptogram is consistent with a current interaction channel for the transaction;

after the token cryptogram is cryptographically validated and determining that the interaction channel indicator in the token cryptogram is consistent with the current interaction channel for the transaction, then detokenizing the token, using a token service computer, to obtain a real credential associated with the token;

determining a risk value associated with the transaction using a modified multiple variable regression formula based on the plurality of values related to the plurality of authentication outcomes, wherein the modified multiple variable regression formula is formed by a process including:

a) receiving interaction data related to a plurality of interactions in a time period, the interaction data comprising a plurality of values associated with a plurality of interaction features, b) determining a multiple variable regression formula comprising explanatory variables associated with the plurality of interaction features and slope coefficients associated with the explanatory variables, c) determining a coefficient of determination associated with the multiple variable regression formula and the interaction data, d) determining, if the coefficient of determination satisfies a threshold and/or is maximized, and e) if the coefficient of determination does not satisfy the threshold or is not maximized, then adjusting the slope coefficients and repeating steps b)-d) until the coefficient of determination satisfies the threshold and/or is maximized to form the modified multiple variable regression formula;

modifying the authorization request message to include the amount, the real credential, and the risk value;

transmitting, to an authorizing computer, the authorization request message comprising the amount, the real credential, and the risk value, wherein the authorizing computer authorizes the transaction based on the amount, the real credential, and the risk value;

receiving, from the authorizing computer, an authorization response message comprising the real credential and an authorization indicator;

modifying the authorization response message to include the token; and transmitting the authorization response message comprising the token and the authorization indicator to the resource provider computer, wherein the resource provider stores the token instead of the real credential, thereby protecting the real credential from obtaining the real credential in a data breach of the resource provider computer.

13. The processing computer of claim 12, the operations further comprising:

g) receiving additional interaction data related to a plurality of additional interactions in a subsequent time period, the additional interaction data comprising an additional plurality of values associated with the plurality of interaction features;

h) determining an updated multiple variable regression formula comprising the explanatory variables associated with the plurality of interaction features and updated slope coefficients associated with the explanatory variables;

i) determining a coefficient of determination associated with the updated multiple variable regression formula and the interaction data;

j) determining if the coefficient of determination satisfies an updated threshold and/or is maximized;

k) if the coefficient of determination does not satisfy the updated threshold or is not maximized, then adjusting the updated slope coefficients and repeating steps i) and k); and l) if the coefficient of determination does satisfy the threshold or is maximized, then using the updated multiple variable regression formula to determine risk associated with additional future interactions.

14. The processing computer of claim 12, wherein the plurality of interactions are a plurality of token transactions, the interaction data is transaction data, and the plurality of interaction features are related to a plurality of authentication features.

15. The processing computer of claim 12, wherein the interaction data further comprises historical risk data.

16. The processing computer of claim 12, wherein the multiple variable regression formula has the format $y_i = \beta_0 + \beta_1 x_{i1} + \beta_2 x_{i2} + \beta_3 x_{i3} + \beta_4 x_{i4} + \beta_5 x_{i5} + \varepsilon$, wherein $y_i$ is the predicted risk, $\beta_0$ is a y-intercept, $\varepsilon$ is a residual term, and $\beta_1$, $\beta_2$, $\beta_3$, $\beta_4$, $\beta_5$ are slope coefficients for each explanatory variable $x_{i1}$, $x_{i2}$, $x_{i3}$, $x_{i4}$, $x_{i5}$.

17. The method of claim 1, wherein the resource provider computer is a merchant computer.

18. The method of claim 1, wherein the computer is a processing computer is configured to process credit and debit card transactions.

19. The method of claim 1, wherein the real credential is a credit card number or a debit card number.

\*   \*   \*   \*   \*